United States Patent
Vo et al.

(10) Patent No.: US 10,160,899 B2
(45) Date of Patent: Dec. 25, 2018

(54) METHOD OF TREATING WATER-SWELLABLE MINERALS IN A SUBTERRANEAN FORMATION WITH A STABILIZING COMPOUND WITH A CATIONIC GROUP AND HYDROPHOBIC PORTION

(71) Applicant: Halliburton Energy Services, Inc., Houston, TX (US)

(72) Inventors: Loan K. Vo, Houston, TX (US); Jimmie D. Weaver, Duncan, OK (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/304,468

(22) PCT Filed: May 15, 2014

(86) PCT No.: PCT/US2014/038165
§ 371 (c)(1),
(2) Date: Oct. 14, 2016

(87) PCT Pub. No.: WO2015/174982
PCT Pub. Date: Nov. 19, 2015

(65) Prior Publication Data
US 2017/0058182 A1    Mar. 2, 2017

(51) Int. Cl.
| | | |
|---|---|---|
| *E21B 33/13* | (2006.01) | |
| *C09K 8/467* | (2006.01) | |
| *C09K 8/035* | (2006.01) | |
| *C09K 8/40* | (2006.01) | |
| *C09K 8/68* | (2006.01) | |
| *C09K 8/88* | (2006.01) | |
| *C04B 28/02* | (2006.01) | |
| *C04B 12/00* | (2006.01) | |
| *C04B 24/12* | (2006.01) | |
| *C04B 28/00* | (2006.01) | |
| *C09K 8/62* | (2006.01) | |
| *E21B 21/00* | (2006.01) | |
| *E21B 43/26* | (2006.01) | |

(52) U.S. Cl.
CPC ............ *C09K 8/467* (2013.01); *C04B 12/005* (2013.01); *C04B 24/121* (2013.01); *C04B 24/124* (2013.01); *C04B 28/001* (2013.01); *C04B 28/02* (2013.01); *C09K 8/035* (2013.01); *C09K 8/40* (2013.01); *C09K 8/62* (2013.01); *C09K 8/68* (2013.01); *C09K 8/88* (2013.01); *C09K 2208/12* (2013.01); *E21B 21/00* (2013.01); *E21B 33/13* (2013.01); *E21B 43/26* (2013.01)

(58) Field of Classification Search
CPC .......... C09K 8/467; C09K 8/035; C09K 8/62; C09K 8/68; C09K 8/88; C09K 2208/12; C04B 12/005; C04B 24/121; C04B 28/001; C04B 28/02; E21B 43/26; E21B 21/00; E21B 33/13
USPC ........................................................ 166/292
See application file for complete search history.

(56) References Cited

U.S. PATENT DOCUMENTS

| | | | | |
|---|---|---|---|---|
| 4,460,627 | A | * | 7/1984 | Weaver ................ C09K 8/50 427/212 |
| 4,558,741 | A | | 12/1985 | Borchardt et al. |
| 7,182,136 | B2 | | 2/2007 | Dalrymple et al. |
| 7,740,071 | B2 | | 6/2010 | Smith et al. |
| 8,084,402 | B2 | | 12/2011 | Berry et al. |
| 8,220,565 | B1 | | 7/2012 | Murphy et al. |
| 8,420,576 | B2 | | 4/2013 | Eoff et al. |
| 2004/0235677 | A1 | | 11/2004 | Nguyen et al. |
| 2005/0178549 | A1 | | 8/2005 | Eoff et al. |
| 2013/0310284 | A1 | * | 11/2013 | Weaver ................ C09K 8/12 507/121 |
| 2014/0000899 | A1 | * | 1/2014 | Nevison ................ E21B 43/26 166/308.1 |
| 2014/0069644 | A1 | * | 3/2014 | Reddy ...................... C09K 8/03 166/278 |
| 2014/0190700 | A1 | * | 7/2014 | Tang ...................... E21B 43/025 166/307 |

OTHER PUBLICATIONS

International Search Report and Written Opinion dated Feb. 13, 2015; International PCT Application No. PCT/US2014/038165.

* cited by examiner

*Primary Examiner* — Silvana C Runyan
(74) *Attorney, Agent, or Firm* — McGuireWoods LLP

(57) ABSTRACT

A treatment fluid for treating a portion of a water-sensitive subterranean formation comprising: a base fluid; and a stabilizing compound, wherein the stabilizing compound reduces or eliminates swelling of a water-swellable mineral of the portion of the water-sensitive subterranean formation, and wherein the stabilizing compound comprises: (A) a cationic functional group; and (B) a hydrophobic portion. A method of treating a portion of a water-sensitive subterranean formation comprising: introducing a treatment fluid into a wellbore, wherein the wellbore penetrates the subterranean formation, wherein the portion of the subterranean formation comprises a water-swellable mineral.

14 Claims, No Drawings

METHOD OF TREATING WATER-SWELLABLE MINERALS IN A SUBTERRANEAN FORMATION WITH A STABILIZING COMPOUND WITH A CATIONIC GROUP AND HYDROPHOBIC PORTION

TECHNICAL FIELD

Additives such as clay stabilizers can be used in a variety of oil and gas treatment fluids. The stabilizer can help prevent a clay from swelling, which could reduce the permeability of a subterranean formation.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. It is to be understood that any of the phases of a heterogeneous fluid (e.g., a continuous or dispersed phase) can contain dissolved or undissolved substances or compounds. The "base fluid" is the solvent of a solution or the continuous phase of a heterogeneous fluid.

Oil and gas hydrocarbons are naturally occurring in some subterranean formations. In the oil and gas industry, a subterranean formation containing oil or gas is referred to as a reservoir. A reservoir may be located on land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Some subterranean formations can be adversely affected by water. One example of a formation that can be adversely affected by water is a water-sensitive formation. Water-sensitive minerals, such as water-swellable clays can be present in a water-sensitive formation. The water-swellable clays generally have positively-charged groups or atoms called a cationic group that can attract water. The water can enter the space between the clay molecules, commonly called the D-space. When the water enters the D-space, the volume of the space can increase, thus causing swelling or a volumetric expansion of the clay molecules. Such swelling has been known to decrease the permeability of the subterranean formation by as much as 90%. Obviously any decrease in the permeability of the formation is undesirable as it can obstruct production of a reservoir fluid.

Therefore, a stabilizing compound can be added to a treatment fluid to help decrease the amount of swelling of water-swellable clays. A stabilizing compound can include a cationic group that is capable of displacing the cationic group of the clay. If the cationic group of the stabilizing compound is physically larger or has less affinity for the water molecules compared to the cationic group of the clay, then less water will enter the D-space of the clay molecules. This can help reduce the amount of swelling of the clay and reduce the decrease in permeability.

However, there is a continuing need and thus, ongoing industry-wide interest in new stabilizing compounds that can provide the most reduction in swelling of water-swellable clays or other water-sensitive minerals. It has been discovered that a new stabilizing compound additive can include a cationic functional group and a hydrophobic portion. The new stabilizing compound can decrease the amount of swelling of water-swellable minerals more than other stabilizing compounds due to the addition of the hydrophobic portion.

According to an embodiment, a treatment fluid for treating a portion of a water-sensitive subterranean formation comprising: a base fluid; and a stabilizing compound, wherein the stabilizing compound reduces or eliminates swelling of a water-swellable mineral of the portion of the water-sensitive subterranean formation, and wherein the stabilizing compound comprises: (A) a cationic functional group; and (B) a hydrophobic portion.

According to another embodiment, a method of treating a portion of a water-sensitive subterranean formation comprising: introducing the treatment fluid into a wellbore, wherein the wellbore penetrates the subterranean formation, wherein the portion of the subterranean formation comprises a water-swellable mineral.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid includes a base fluid. The base fluid can be water. The water can be selected from the group consisting of freshwater, brackish water, saltwater, and any combination thereof. The base fluid can further include a water-soluble salt. Preferably, the salt is selected from the group consisting of sodium chloride, calcium chloride, calcium bromide, potassium chloride, potassium bromide, magnesium chloride, sodium bromide, cesium formate, cesium acetate, and any combination thereof.

The base fluid can also be a hydrocarbon liquid. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is an alkane. The paraffin can be an isoalkane (isoparaffin), a linear alkane (paraffin), or a cyclic alkane (cycloparaffin). Example of suitable alkanes include SARALINE® 185V synthetic base fluid (a mixture of alkanes with carbon chain lengths predominately of C10 to C20), available from Shell MDS in Malaysia and BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include ENCORE® drilling fluid and ACCOLADE® drilling fluid, marketed by Halliburton Energy Services, Inc.

The treatment fluid includes the stabilizing compound. The stabilizing compound can be a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

The stabilizing compound comprises a cationic functional group. A cation or cationic functional group is an atom or group of atoms that has a positive charge. The cationic functional group can be located on the backbone of the polymer. The cationic functional group can be a fully quaternized or partially quaternized amine, or phosphorus atom (e.g., an ammonium ion or phosphonium ion). The cationic functional group can also have no quaternization. According to this embodiment, an amine, for example, can behave as a cation when its pKa is around 9. Therefore, if the cationic functional group contains no quaternization, then preferably the pKa of the cationic functional group is sufficient such that the group behaves as a cation. Moreover, the pH of the base fluid can also affect if the functional group behaves as a cation. For example, a non-quaternized amine's behavior as a cation becomes more dominant as the pH of the fluid decreases towards a pH of 7; however, around a pH of 12, the amine is mostly non-ionic (i.e., having a neutral charge). Therefore, if the functional group contains no quaternization, then the pH of the base fluid is preferably selected such that the functional group behaves as a cation.

The portion of the subterranean formation comprises a water-swellable mineral. The water-swellable mineral can be clays, such as clays in the smectite group, and fines capable of migrating when disturbed such as silica, iron minerals, and alkaline earth metal carbonates. The water-swellable mineral is capable of swelling or increasing in volume when in contact with an aqueous liquid. The cationic functional group can have an affinity for the water-swellable mineral. Preferably, the cationic functional group has a strong affinity for the water-swellable mineral, for example, a stronger affinity than other cationic groups of the mineral. The cationic functional group can also ionically interact with the water-swellable mineral, for example, by displacing other cationic groups of the mineral.

The stabilizing compound also comprises a hydrophobic portion. The stabilizing compound can also contain more than one hydrophobic portion. The hydrophobic portion can be a hydrocarbon or fatty acid. The hydrophobic portion can be a short, medium, long, or very long chain hydrocarbon or fatty acid. The hydrophobic portion can have a carbon chain length in the range of $C_4$-$C_{24}$, preferably $C_6$-$C_{18}$. The hydrocarbon can be an alkane, alkene, or alkyne. The fatty acid can be an unsaturated fatty acid. The fatty acid can be selected from the group consisting of tall oil, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, coconut oil, palm kernel oil, palm oil, cottonseed oil, wheat germ oil, soybean oil, olive oil, corn oil, sunflower oil, safflower oil, canola oil, and combinations thereof. Moreover, if there is more than one hydrophobic portion, then the hydrophobic portions can be the same type or different. By way of example, one or more of the hydrophobic portions can be a hydrocarbon and the other one or more hydrophobic portions can be a fatty acid.

If there is more than one hydrophobic portion, then according to certain embodiments, the hydrophobic portions can be physically separated from the cationic functional group on the stabilizing compound. By way of example, polyethylene oxide can be used as an intermediary molecule between the hydrophobic portions and the cationic functional group. The number of polyethylene oxide molecules between each hydrophobic portion and the cation can range from 1 to about 10 repeating units and can be selected such that the desired separation occurs. The physical separation can help reduce or eliminate the stabilizing compound from balling up on itself instead of maintaining a long, open configuration.

The hydrophobic portion will naturally repel water. As such, some of the advantages of the hydrophobic portion are that the stabilizing compound has another level of water-repelling capability, and the stabilizing compound is physically larger than other compounds, which allows the compound to take up more of the D-space of the water-sensitive minerals to prevent water from entering the D-space.

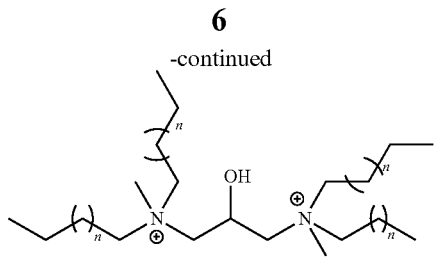

The following is another illustration of a stabilizing compound according to certain embodiments. This stabilizing compound can be made by hydrophobically-modifying polyethyleneimine, followed by quaternization with an alkyl halide.

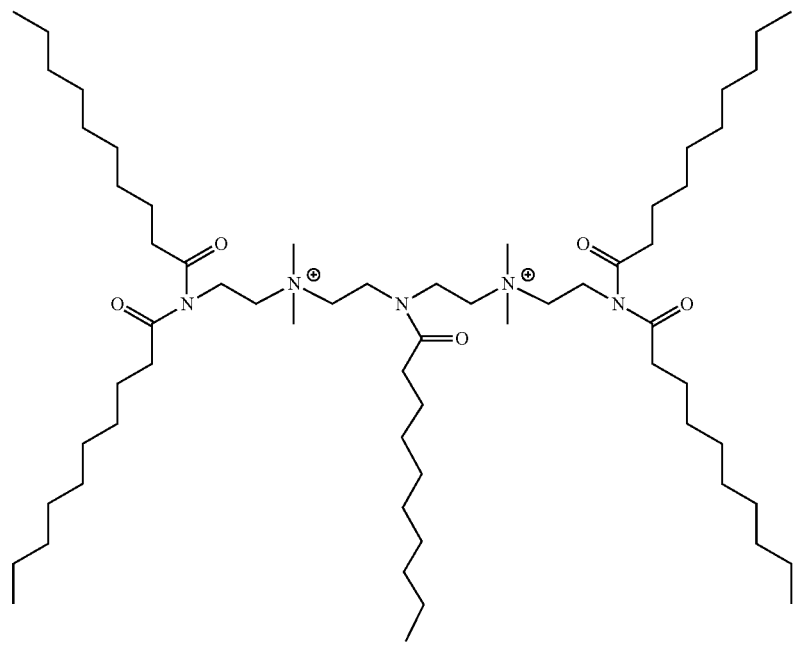 [SMILES: CCCCCCCCCC(=O)N(CC[N+](C)(C)CCN(C(=O)CCCCCCCCC)C(=O)CCCCCCCCC)CC[N+](C)(C)CCN(C(=O)CCCCCCCCC)C(=O)CCCCCCCCC]

The following is one illustration of a stabilizing compound according to certain embodiments. This stabilizing compound can be made by reacting a dialkylamine with epichlorohydrin, followed by quaternization of the amine with a short-chained alkyl halide, where n can be $C_4$-$C_{24}$.

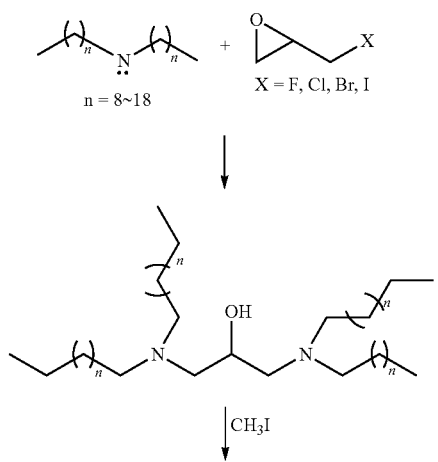

According to an embodiment, the treatment fluid can be any fluid used in an oil or gas operation. For example, the treatment fluid can be a drilling fluid, spacer fluid, cement composition, workover fluid, fracturing fluid, etc.

Depending on the exact type of treatment fluid, the treatment fluid can further include one or more additives. For example, the treatment fluid can further include a viscosifier. The viscosifier can be selected from the group consisting of fatty acids, natural and synthetic polymers, polysaccharide derivatives such as xanthan gum, guar gum, hydroxyalkylguar, hydroxyalkylcellulose, carboxyalkylhydroxyalkylguar, wellan gum, gellan gum, diutan, scleroglucan, succinoglucan, various celluloses, biopolymers, and combinations thereof. Commercially-available examples of a suitable viscosifier include, but are not limited to, BARAZAN® D PLUS, PAC™-R, PAC™-RE, PAC™-L, AQUA-GEL®, AQUAGEL GOLD SEAL®, and combinations thereof, marketed by Halliburton Energy Services, Inc.

The treatment fluid can further include a weighting agent. The weighting agent can be selected from the group consisting of barite, hematite, manganese tetroxide, calcium carbonate, and combinations thereof. Commercially-available examples of a suitable weighting agent include, but are not limited to, Barite, BAROID®, BARACARB®, BARODENSE®, MICROMAX™, and combinations thereof, marketed by Halliburton Energy Services, Inc. According to an embodiment, the weighting agent is in a concentration such that the treatment fluid has a desired density.

The treatment fluid can also include a friction reducer. Commercially-available examples of a suitable friction reducer include, but are not limited to, TORQ-TRIM® 22, LUBRA-BEADS®, EZMUD LUBE®, NXS-LUBE™, DRIL-N-SLIDE™, ENVIRO-TORQ®, graphitic carbon, and combinations thereof, marketed by Halliburton Energy Services, Inc.

The treatment fluid can also include cement, proppant, a filler, a fluid loss additive, a set retarder, a strength-retrogression additive, a light-weight additive, a defoaming agent, a mechanical property enhancing additive, a lost-circulation material, a filtration-control additive, a thixotropic additive, and combinations thereof.

The treatment fluid can have a pH in the range of about 5 to about 12. If the cationic functional group is not quaternized, then preferably, the treatment fluid has a pH such that the functional group behaves as a cation. The drilling fluid can further comprise a pH adjuster. The pH adjuster can be an acid or a base. According to an embodiment, the pH adjuster is selected and the pH adjuster is in a concentration such that the drilling fluid has a pH in the desired range. The drilling fluid can also include a pH buffer. A commercially-available example of a pH buffer is BARABUF®.

According to the method embodiments, the methods include introducing the treatment fluid into a wellbore, wherein the wellbore penetrates the water-sensitive subterranean formation. The subterranean formation can be on land or off shore. The subterranean formation can be a shale formation.

The step of introducing the treatment fluid can be, for example, for the purpose of drilling the wellbore, cementing the wellbore, fracturing the subterranean formation, or performing a clean-up or workover on the wellbore. The treatment fluid can be in a pumpable state before and during introduction into the wellbore. The well can be an oil, gas, and/or water production well, an injection well, or a geothermal well. The subterranean formation can include an annulus. The step of introducing the treatment fluid can include introducing the treatment fluid into a portion of the annulus. The methods can further include the additional steps of perforating, fracturing, or performing an acidizing treatment.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a water-sensitive subterranean formation comprising:
   introducing a treatment fluid into a wellbore, wherein the wellbore penetrates the subterranean formation,
      wherein the portion of the subterranean formation comprises a water-swellable mineral, and wherein the treatment fluid comprises:
      (A) a hydrocarbon base fluid; wherein the hydrocarbon base fluid is selected from the group consisting of: a fractional distillate of crude oil; a saturated hydrocarbon; an unsaturated hydrocarbon; a branched hydrocarbon; a cyclic hydrocarbon; and any combination thereof; and
      (B) a stabilizing compound, wherein the stabilizing compound comprises:
         (i) a cationic functional group; and
         (ii) a hydrophobic portion,
         wherein the stabilizing compound comprises a product of a reaction of a dialkylamine with an epichlorohydrin; wherein the dialkylamine comprises two alkyl groups; wherein both alkyl groups of the dialkylamine individually comprise a carbon number of 4 or greater, wherein the hydrophobic portion is a short, medium, long, or very long chain fatty acid, and wherein the fatty acid is an unsaturated fatty acid.

2. The method according to claim 1, wherein the stabilizing compound is a polymer.

3. The method according to claim 2, wherein the cationic functional group is located on a backbone of the polymer.

4. The method according to claim 1, wherein the cationic functional group is a fully quaternized or partially quaternized amine, or phosphorus atom.

5. The method according to claim 1, wherein the cationic functional group does not have any quaternization.

6. The method according to claim 5, wherein the pKa of the cationic functional group is sufficient such that the group behaves as a cation.

7. The method according to claim 1, wherein the cationic functional group ionically interacts with the water-swellable mineral.

8. The method according to claim 1, wherein the water-swellable mineral is a clay or fines capable of migrating when disturbed.

9. The method according to claim 1, wherein the stabilizing compound comprises more than one hydrophobic portion.

10. The method according to claim 1, wherein the hydrophobic portion has a carbon chain length in the range of $C_4$-$C_{24}$.

11. The method according to claim 10, wherein the hydrocarbon is an alkane, alkene, or alkyne.

12. The method according to claim 1, wherein the treatment fluid is a drilling fluid, spacer fluid, cement composition, workover fluid, or fracturing fluid.

13. The method according to claim 1, further comprising mixing the treatment fluid with a mixing apparatus.

14. The method according to claim 1, wherein the step of introducing comprises pumping the treatment fluid into the wellbore.

* * * * *